(12) United States Patent
Korobkin et al.

(10) Patent No.: US 10,438,061 B2
(45) Date of Patent: Oct. 8, 2019

(54) ADAPTIVE QUANTIZATION METHOD FOR IRIS IMAGE ENCODING

(71) Applicant: Samsung Electronics Co., Ltd., Suwon-si, Gyeonggi-do (KR)

(72) Inventors: Mikhail Vladimirovich Korobkin, Moscow (RU); Vladimir Alekseevich Eremeev, Moscow (RU); Aleksei Mikhailovich Fartukov, Moscow (RU); Gleb Andreevich Odinokikh, Moscow (RU); Vitaly Sergeevich Gnatyuk, Moscow (RU); Aleksei Bronislavovich Danilevich, Moscow (RU); Dae-kyu Shin, Suwon-si (KR); Ju-woan Yoo, Anyang-si (KR); Kwang-hyun Lee, Suwon-si (KR); Hee-jun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 15/641,962

(22) Filed: Jul. 5, 2017

(65) Prior Publication Data
US 2018/0012071 A1 Jan. 11, 2018

(30) Foreign Application Priority Data

Jul. 7, 2016 (RU) .................................. 2016127451
Jun. 1, 2017 (KR) ........................ 10-2017-0068659

(51) Int. Cl.
*G06K 9/00* (2006.01)
*G06K 9/32* (2006.01)
(Continued)

(52) U.S. Cl.
CPC ....... *G06K 9/00617* (2013.01); *G06K 9/0061* (2013.01); *G06K 9/3233* (2013.01); *G06K 9/4619* (2013.01); *G06K 9/50* (2013.01)

(58) Field of Classification Search
CPC ............. G06K 9/00617; G06K 9/4619; G06K 9/3233; G06K 9/0061; G06K 9/50
See application file for complete search history.

(56) References Cited

U.S. PATENT DOCUMENTS

| 7,317,814 B2 | 1/2008 | Kostrzewski et al. |
| 8,045,764 B2 | 10/2011 | Hamza |

(Continued)

FOREIGN PATENT DOCUMENTS

| KR | 10-2011-0133271 A | 12/2011 |
| RU | 2014-141345 A | 5/2016 |

(Continued)

OTHER PUBLICATIONS

John Daugman: "How Iris Recognition Works", IEEE Transactions on Circuits and Systems for Video Technology, Institute of Electrical and Electronics Engineers, US, vol. 14, No. 1, Jan. 1, 2004 (Jan. 1, 2004), pp. 21-30, XP011105913, ISSN: 1051-8215, DOI: 10.1109/TCSVT.2003.818350 * p. 2-p. 4  p. 6-p. 9  figures 2,3.

(Continued)

Primary Examiner — John W Lee
(74) Attorney, Agent, or Firm — Jefferson IP Law, LLP

(57) ABSTRACT

A user recognition method that uses an iris is provided. The user recognition method includes generating a first mask for blocking a non-iris object area of an iris image, generating a converted iris image, in which the non-iris object area is blocked according to the first mask, generating a second mask for additionally blocking an inconsistent area, in which quantization results of the converted iris image are inconsistent, by adaptively transforming the first mask (Continued)

according to features of the converted iris image, obtaining an iris code by quantizing pixels included in the iris image, obtaining a converted iris code, in which portions corresponding to the non-iris object area and the inconsistent area are blocked, by applying the second mask to the iris code, and recognizing a user by matching a reference iris code, stored by the user in advance, to the converted iris code.

16 Claims, 14 Drawing Sheets

(51) Int. Cl.
*G06K 9/46* (2006.01)
*G06K 9/50* (2006.01)

(56) References Cited

U.S. PATENT DOCUMENTS

| | | | |
|---|---|---|---|
| 9,195,890 B2 | 11/2015 | Bergen et al. | |
| 2005/0207614 A1* | 9/2005 | Schonberg | G06K 9/00597 382/100 |
| 2006/0269160 A1 | 11/2006 | Jang et al. | |
| 2007/0036397 A1* | 2/2007 | Hamza | G06K 9/00597 382/117 |
| 2010/0074477 A1* | 3/2010 | Fujii | G06K 9/00604 382/117 |
| 2010/0202669 A1* | 8/2010 | Hollingsworth | G06K 9/00617 382/117 |
| 2014/0161325 A1 | 6/2014 | Bergen | |
| 2014/0201126 A1 | 7/2014 | Zadeh et al. | |
| 2016/0019422 A1 | 1/2016 | Savvides et al. | |
| 2016/0110601 A1 | 4/2016 | Son et al. | |
| 2016/0364611 A1* | 12/2016 | Krichen | G06T 7/11 |

FOREIGN PATENT DOCUMENTS

| | | |
|---|---|---|
| WO | 2014-039317 A2 | 3/2014 |
| WO | 2016-060486 A1 | 4/2016 |

OTHER PUBLICATIONS

Radman Abduljalil et al: "Fast and reliable iris segmentation algorithm", IET Image Proces, IET, UK, vol. 7, No. 1, Feb. 1, 2013 (Feb. 1, 2013), pp. 42-49, XP006045706, ISSN: 1751-9659, DOI: 10.1049/IET-IPR.2012.0452 * abstract ** col. 1-col. 3 * * col. 6-col. 10 * * figures 3-6.

Santos Gil et al: "A fusion approach to unconstrained iris recognition", Pattern Recognition Letters, vol. 33, No. 8, Dec. 31, 2013 (Dec. 31, 2013), pp. 984-990, XP028910640, ISSN: 0167-8655, DOI: 10.1016/J. PATREC.2011.08.017 * abstract * A II 1-15 * col. 2-col. 6 * * col. 7-col. 10 * * figures 1-6.

European Office Action dated May 31, 2019; Reference #: P6081079PCT/EP; Application #/Patent #: 17824490.1-1207 / 3459009 PCT/KR2017007066.

* cited by examiner (400)  (410)

(500)

(600)

(700)

(800)

CRITICAL VALUE : 0.2

ADAPTIVE QUANTIZATION METHOD FOR IRIS IMAGE ENCODING

CROSS-REFERENCE TO RELATED APPLICATION(S)

This application claims the benefit under 35 U.S.C. § 119(a) of a Russian patent application filed on Jul. 7, 2016 in the Russian Patent Office and assigned Serial number 2016127451, and a Korean patent application filed on Jun. 1, 2017 in the Korean Intellectual Property Office and assigned Serial number 10-2017-0068659, the entire disclosure of each of which is hereby incorporated by reference.

TECHNICAL FIELD

The present disclosure relates to a method and an apparatus for iris recognition. More particularly, the present disclosure relates to an adaptive quantization method for iris image encoding.

BACKGROUND

Electronic devices may store information, such as addresses, call history, messages, and the like, as well as personal information, such as location information of a person, memos, financial transactions, and the like. In order to protect personal information, electronic devices may have various security functions. More particularly, methods of maintaining security of electronic devices by using bio information of a user have been widely distributed. The method of maintaining the security of the electronic devices by using the bio information may include fingerprint recognition, face recognition, iris recognition, and the like.

More particularly, iris recognition is a verification technique for security by using features of the iris, that is, features varying depending on the person. In addition, the iris recognition may be performed by a camera without directly contacting a body of the user.

However, using the iris recognition technology in mobile devices has a lot of difficulties, for example, severely changing environmental conditions (e.g., indoors/outdoors, clear weather/cloudy weather, wearing of glasses/contacts), limitations in the performance of the devices, which do not allow a device to perform iris recognition in real-time (central processing unit (CPU), random access memory (RAM), camera resolution, and the like), and difficulties in interaction with a user (interactions are sometimes not convenient for the user).

Work flow according to the related art in the iris recognition may include quantization of an iris image for iris code matching. However, inconsistent bits occurring from, for example, the variation in the environmental condition, and in quantization, may increase a false reject rate (FRR), and decrease accuracy and robustness in the iris recognition. Therefore, embodiments of the present disclosure search for and remove the inconsistent bits by using adaptive critical points during or before iris code matching or data base registration, in order to improve the accuracy and the robustness in the iris code matching.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for iris recognition.

A certain part of an iris image may provide inconsistent visual information. Therefore, the performance of iris recognition may degrade due to the part providing the inconsistent visual information. Therefore, in order to improve the performance of the iris recognition, blocking the part providing the inconsistent visual information during processes of the iris recognition may be performed.

In accordance with an aspect of the present disclosure, a user recognition method using an iris is provided. The user recognition method includes generating a first mask for blocking a non-iris object area of an iris image, generating a converted iris image, in which the non-iris object area is blocked according to the first mask, generating a second mask for additionally blocking an inconsistent area, in which quantization results of the converted iris image are inconsistent, by adaptively transforming the first mask according to features of the converted iris image, obtaining an iris code by quantizing pixels included in the iris image, obtaining a converted iris code, in which portions corresponding to the non-iris object area and the inconsistent area are blocked, by applying the second mask to the iris code, and recognizing a user by matching a reference iris code, stored by the user in advance, to the converted iris code.

In accordance with another aspect of the present disclosure, a user recognition device by using an iris is provided. The user recognition device includes a mask generator configured to generate a first mask for blocking a non-iris object area of an iris image, to generate a converted iris image, in which the non-iris object area is blocked according to the first mask, and to generate a second mask for additionally blocking an inconsistent area, in which quantization results of the converted iris image are inconsistent, by transforming the first mask adaptively according to features of the converted iris image, an iris code generator configured to obtain an iris code by quantizing pixels included in the iris image, and to obtain a converted iris code, in which portions corresponding to the non-iris object area and the inconsistent area are blocked, by applying the second mask to the iris code, and an iris scanner configured to recognize a user by matching a reference iris code, stored by the user in advance, to the converted iris code.

In accordance with another aspect of the present disclosure, a computer program product is provided. The computer program product includes a computer-readable storage medium, wherein the computer-readable storage medium includes instructions for performing each process in the user recognition method by using the iris.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
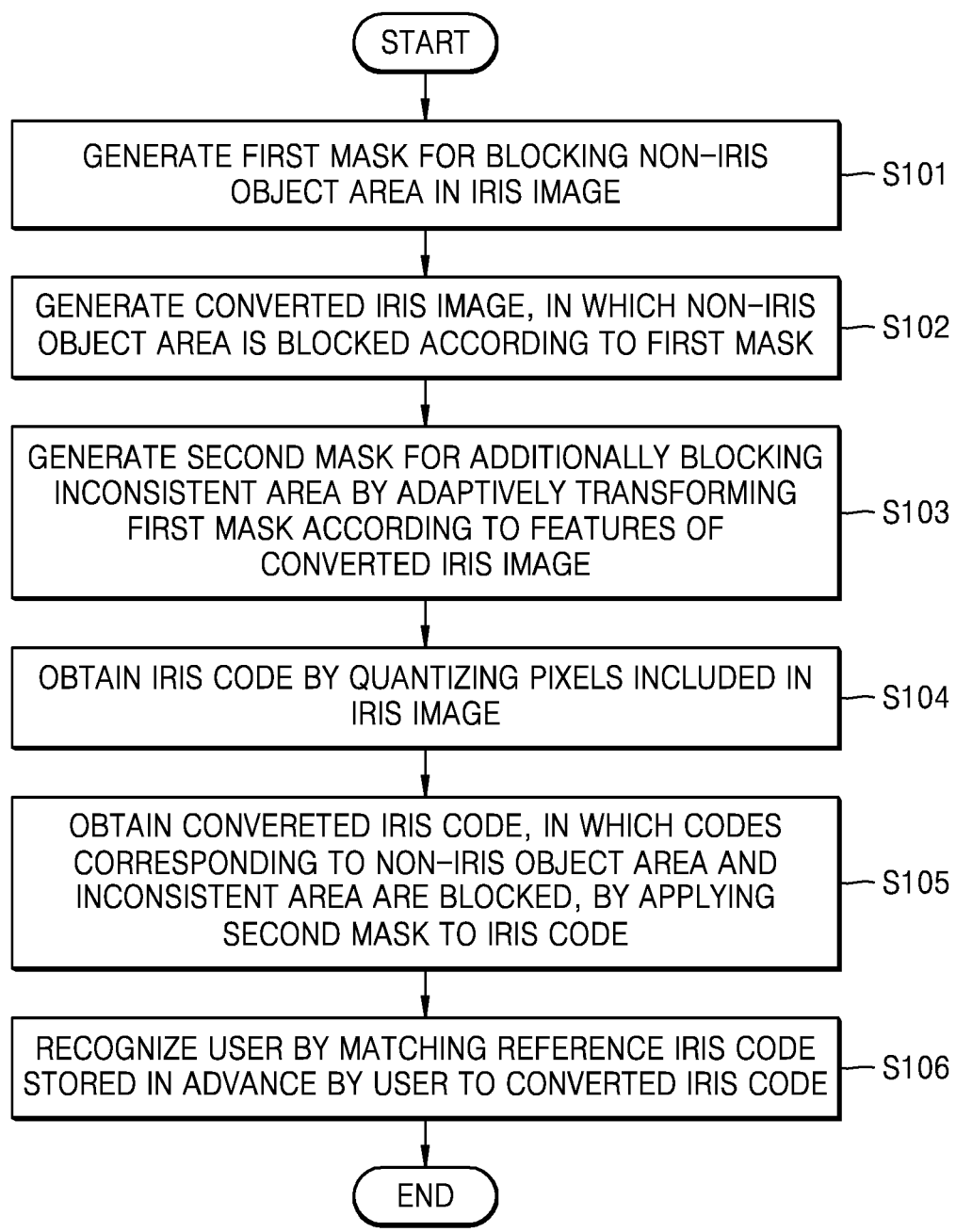
FIG. 1 is a flowchart illustrating iris recognition processes according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, one of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "eye region" includes reference to one or more of such images about "eye region".

While such terms as "first," "second," and the like, may be used to describe various components, such components must not be limited to the above terms. These terms are only used to distinguish one component from another.

It will be further understood that the terms "comprises" and/or "comprising" used herein specify the presence of stated features or components, but do not preclude the presence or addition of one or more other features or components.

In various embodiments of the present disclosure, "module" or "unit" may perform at least one function or operation, and may be implemented as hardware, software, or a combination thereof "A plurality of modules" or "a plurality of units" may be implemented as at least one processor (not shown) via combination with one or more other modules than the "module" or "unit" that needs to be implemented as certain hardware.

As used herein, the term "and/or" includes any and all combinations of one or more of the associated listed items. Expressions, such as "at least one of," when preceding a list of elements, modify the entire list of elements and do not modify the individual elements of the list.

The various embodiments will now be described more fully with reference to the accompanying drawings.

An electronic device according to various example embodiments of the disclosure may include at least one of, for example, a smart phone, a tablet personal computer (PC), a mobile phone, a video phone, an electronic book reader (e-book reader), a desktop PC, a laptop PC, a personal digital assistant (PDA), a portable multimedia player (PMP), a moving picture experts group (MPEG-1) audio layer-3 (MP3) player, a mobile medical device, a camera, and a wearable device (e.g., a head-mounted display (HMD), for example, electronic glasses, electronic clothing, an electronic bracelet, an electronic necklace, an electronic accessory, an electronic tattoo, or a smart watch).

FIG. 1 is a flowchart illustrating iris recognition processes according to an embodiment of the present disclosure. The iris recognition process according to the embodiment of the present disclosure may include following operations S101 to S106.

Referring to FIG. 1, in operation S101, a first mask for blocking a non-iris object area in an iris image is generated. In order to obtain the iris image, an eye image may be extracted from a face image captured by an internal or external camera of an electronic device. The face image denotes an image including the whole face of a user or a partial face including at least an eye portion. The eye image corresponds to the eye region in the face image. The electronic device for obtaining the face image includes a mobile terminal, a mobile phone, a desktop computer, a smart watch, and the like, but is not limited thereto. The face image may be captured as a full-color image or a monochrome image.

Figure 2:
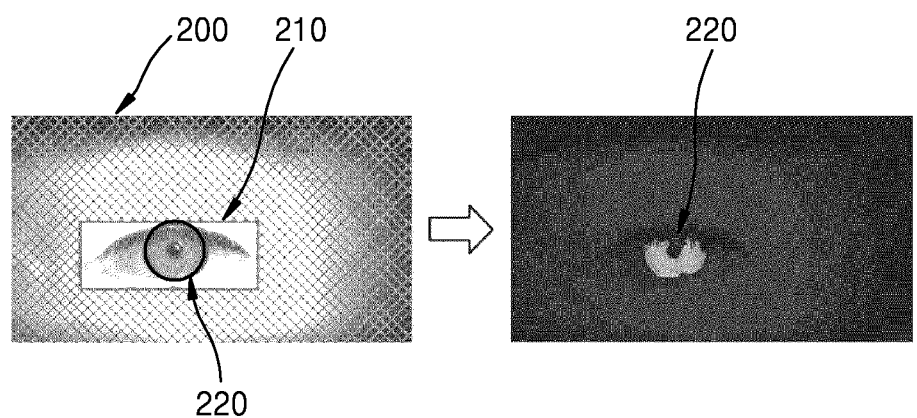
FIG. 2 is a diagram showing segmenting an iris image from an eye image according to an embodiment of the present disclosure.

The iris image is an image of an iris and objects adjacent to the iris included in the eye. The iris image is segmented from the eye image, and in this specification, the term "segmentation" denotes emphasizing or selecting a certain object from an image. The iris image may include such objects as a pupil, an eyelid, eyelashes, a sclera, an iris, and the like. FIG. 2 shows an example of an iris image segmentation.

FIG. 2 is a diagram showing segmenting an iris image from an eye image according to an embodiment of the present disclosure.

Referring to FIG. 2, an eye image 210 and an iris image 220 are illustrated. The left side of FIG. 2 shows segmenting of the iris image 220 from the eye image 210 included in a face image 200. In addition, the right side of FIG. 2 shows the iris image 220 emphasized in grey according to the result of segmentation. According to the left side of FIG. 2, an area of the iris image 220 is determined by excluding a circular area that is determined according to the size of the pupil from a circular area determined according to the size of the iris. Therefore, the shape of the area of the iris image 220 is a ring.

Figure 3:
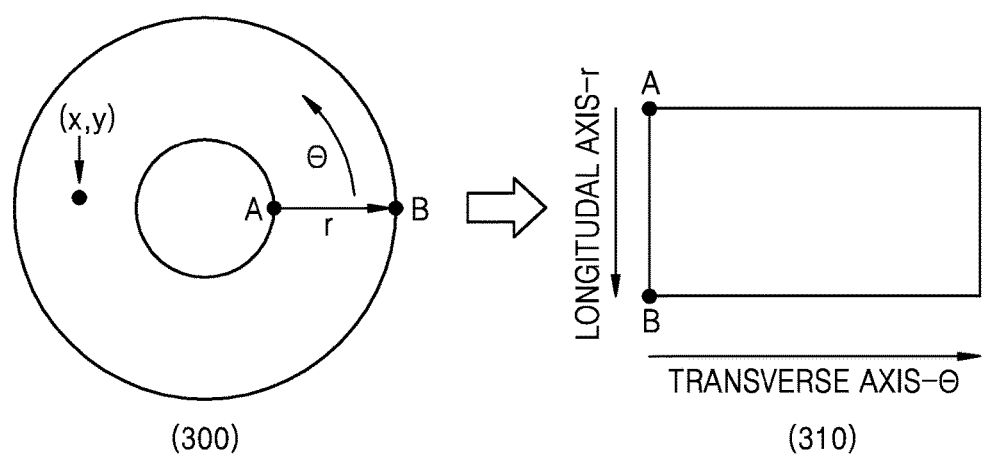
FIGS. 3 and 4 illustrate regularizing an iris image according to various embodiments of the present disclosure.
Figure 4:
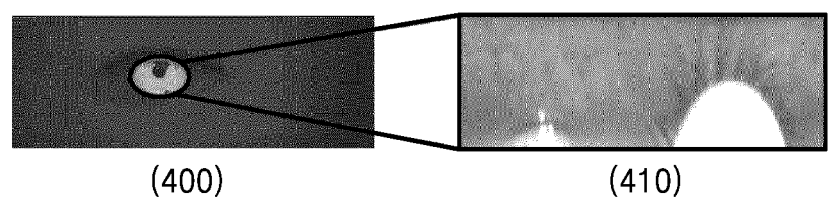

A pattern of the iris is determined by analyzing muscles of the iris, which are spread radially from the pupil. Therefore, if the ring-shaped iris image is transformed into a rectangular iris image, it may be easier to analyze the pattern of the iris. The above transformation of the iris image is defined as a normalization of the iris image. FIGS. 3 and 4 illustrate normalization of the iris image.

FIGS. 3 and 4 illustrate regularizing an iris image according to various embodiments of the present disclosure.

Referring to FIG. 3, on the left side of FIG. 3, a location of each pixel in a ring-shaped iris image 300 may be expressed as (r, θ) according to polar coordinates. In the coordinate (r, θ), r denotes a distance from a center to the pixel, and θ denotes a direction of the pixel from the center. The ring-shaped iris image 300 may be normalized by corresponding r to a vertical axis and θ to a horizontal axis, as shown on the right side of FIG. 3. For example, A and B in the ring-shaped iris image 300 may correspond to A and B in a rectangular iris image 310. Other pixels in the ring-shaped iris image 300 also correspond to the rectangular iris image 310 according to (r, θ). Thus, the rectangular iris image 310 that has been normalized is generated.

Referring to FIG. 4, an example of the normalization of the iris image is illustrated. The left side of FIG. 4 shows a ring-shaped iris image 400. In addition, the right side of FIG. 4 shows an iris image 410 that is obtained by normalizing the ring-shaped iris image 400. As shown in the example of the normalized iris image 410 of FIG. 4, if the eyelid or eyelashes partially block the iris, the performance of iris recognition may degrade. Therefore, it is necessary to remove obstacles, such as the eyelid or the eyelashes from the iris image. In the present specification, an area corresponding to the obstacles, such as the eyelid or the eyelashes is defined as the non-iris object area. On the contrary, an area corresponding to the iris is defined as an iris object area.

In order to remove the non-iris object area, a mask for inactivating the non-iris object area may be generated. In the present specification, the mask for removing the non-iris object area is defined as a first mask. However, the term 'first mask' is just defined for convenience of description, and may be defined by other terms.

Figure 5:
FIG. 5 is a diagram of a first mask and an iris image to which the first mask is applied according to an embodiment of the present disclosure.

FIG. 5 is a diagram of a first mask and an iris image to which the first mask is applied according to an embodiment of the present disclosure.

Referring to FIG. 5, an example of a first mask 500 is illustrated. A black portion in the first mask 500 corresponds to the non-iris object area. Therefore, a part of the iris image corresponding to the black portion is not used in iris matching. A white portion in the first mask 500 corresponds to the iris object area. Therefore, a part of the iris image corresponding to the white portion may be used in matching to a corresponding portion of a reference iris image that is stored in advance. In the present specification, the reference iris image denotes an image showing an iris pattern of the user, which is stored in an internal or external database in advance.

The first mask 500 may be expressed as bits. Whether to block a pixel in the iris image may be expressed by at least one bit. When the one bit is 0, a pixel corresponding to the one bit is excluded in the iris matching. On the other hand, when the one bit is 1, the pixel corresponding to the one bit may be used in the iris matching. If each of the pixels in the iris image is expressed by a complex number including a real number and an imaginary number, whether to block the pixel in the iris image may be expressed by two bits.

The first mask 500 may be applied equally to the reference image that is compared with the iris image, as well as the iris image. As another example, when there is a reference mask for removing a non-iris object area in the reference image, a combined mask that is obtained by combining the first mask 500 with the reference mask may be applied equally to the iris image and the reference image.

Figure 6:
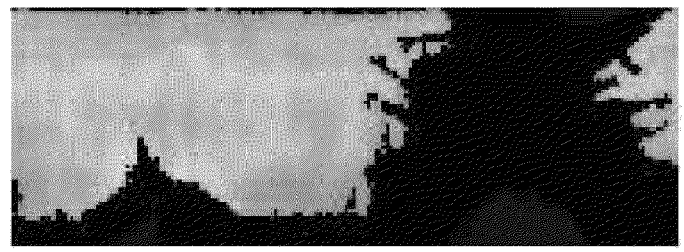
FIG. 6 is a diagram of a converted iris image, in which a non-iris object region is blocked by applying a first mask according to an embodiment of the present disclosure.

FIG. 6 is a diagram of a converted iris image, in which a non-iris object region is blocked by applying a first mask according to an embodiment of the present disclosure.

Referring to FIG. 6, in operation S102, a converted iris image, in which the non-iris object area is blocked by the first mask, is generated. FIG. 6 shows a converted iris image 600, in which the non-iris object area is blocked by applying the first mask. In the converted iris image 600, the iris image of the iris object area only remains because the non-iris object area is blocked.

The iris pattern of the converted iris image may be quantized for iris matching. The quantization converts physical quantity having continuous values into physical quantity having discontinued values. The quantization process may include a binarization process that expresses a numerical document by bits having values of 0 and 1, and may be a part of an encoding process. As an example of binarization, when a pixel value of the converted iris image is less than 0, the pixel value is determined to be 0, and when the pixel value of the converted iris image is greater than 0, the pixel value may be determined to be 1. Therefore, as a result of binarization, the pixels may be expressed by bits.

The iris pattern of one user may be captured a little differently depending on the health condition of the user and a photographing environment, and the like. If the iris pattern of the reference iris image and the iris pattern of the iris image are different from each other due to the influence of the photographing environment, a user verification device may recognize the iris image of the same user as an iris image of another person. Therefore, fine variation in the iris pattern caused by the photographing environment may be removed by binarizing the converted iris image.

However, if the pixel has a pixel value close to 0 in the converted iris image, the binarization result of the pixel value may not be consistent. For example, a pixel having a pixel value between −1 to 1 may be binarized into 0 or 1 according to the peripheral environment. In the present specification, a bit of the pixel having inconsistent result of binarization is defined as an inconsistent bit. Therefore, in order to improve robustness of the iris matching, there is a need to additionally block the pixel that is determined to include the inconsistent bit during the iris matching process.

Figure 7:
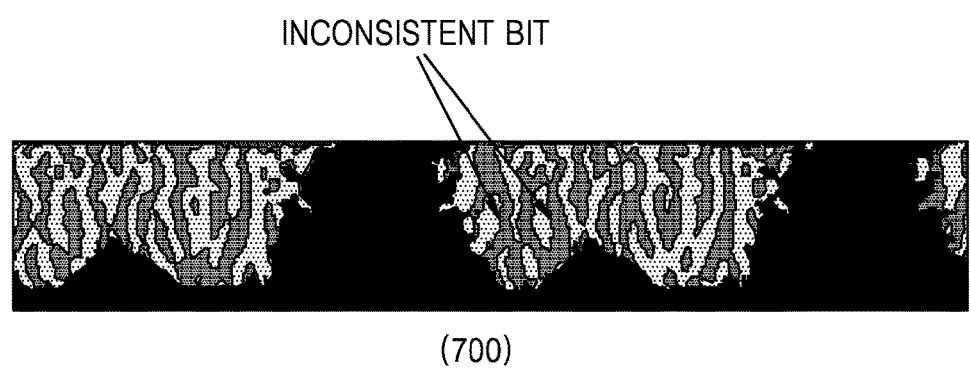
FIG. 7 is a diagram of a converted iris image that is binarized in order to emphasize characteristics of an iris according to an embodiment of the present disclosure.

FIG. 7 is a diagram of a converted iris image that is binarized in order to emphasize characteristics of an iris according to an embodiment of the present disclosure.

Referring to FIG. 7, a converted iris image 700 that is binarized is illustrated. A grey portion in the binarized converted iris image 700 denotes an area that is binarized into the value 1. In addition, a white portion in the binarized converted iris image 700 denotes an area that is binarized into the value 0. Since the pixels at a boundary between the grey portion and the white portion are likely to have a value close to 0, the pixel values may be binarized into 0 or into 1 according to the peripheral environment. Therefore, with respect to the pixels at the boundary between the grey portion and the white portion, it is determined whether the binarization result is consistent, and it is necessary to additionally block the pixels, the binarization results of which are determined inconsistent, from the iris matching.

In operation S103, the first mask 500 is adaptively transformed according to characteristics of the converted iris image to generate a second mask that additionally blocks an inconsistent area, where the quantization result or binarization result of the converted iris image is not consistent. The inconsistent area includes the pixels, the quantization or binarization results of which are likely to be changed according to the peripheral environment. The inconsistent area is determined based on the pixels of the converted iris image, and the first mask 500 is transformed to additionally block the inconsistent area, as well as the non-iris object area. According to the transformation result, the second mask blocking both the non-iris object area and the inconsistent area is generated.

The pixels of the converted iris image may each have a real number value. The real number value of the pixel may be determined based on a grey level corresponding to the pixel of the iris image.

In addition, the pixels in the converted iris image may each be expressed by a complex number. The pixel value expressed by the complex number may be determined based on a grey level corresponding to the pixel of the iris image. According to an embodiment of the present disclosure, the grey levels of the pixels in the converted iris image may be expressed as a set of complex numbers representing amplitude information and phase information of the iris pattern according to a Gabor filter. In the iris recognition, the amplitude information that is affected by the light source or camera gain is removed, and the phase information representing the marks of the complex numbers corresponding to the pixels of the converted iris image may be only used. The phase information may be extracted by other techniques or filters including a filter based on Fourier transformation, a filter based on wavelet transformation, and the like, than the above Gabor filter.

Figure 8:
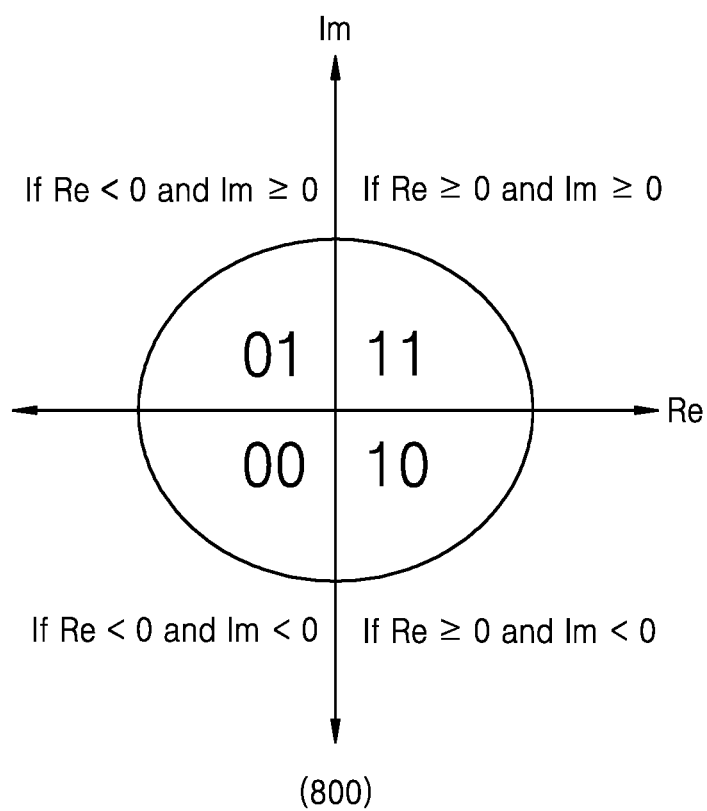
FIG. 8 is a diagram of generating an iris feature vector according to a Gabor filter and binarization according to an embodiment of the present disclosure.

FIG. 8 is a diagram of generating an iris feature vector according to a Gabor filter and binarization according to an embodiment of the present disclosure.

Referring to FIG. 8, a graph 800 of a method of determining an iris feature vector according to the Gabor filter and binarization is illustrated. As described above, the grey level of the pixel may be expressed by the complex number according to the Gabor filter. In the iris recognition, the amplitude information representing the size of the complex number is removed and the phrase information representing the mark of the complex number is only used. Therefore, the complex number value of the pixel obtained by using the Gabor filter is binarized to generate the iris feature vector.

Conditions for generating the iris feature vector illustrated in the graph 800 are as follows.

if Re>0, Im>0 then {1, 1}
if Re>0, Im<0 then {1, 0}
if Re<0, Im<0 then {0, 0}
if Re<0, Im>0 then {0, 1}

In the above conditions, Re denotes a real part of the complex number value and Im denotes an imaginary part of the complex number value. For example, if the pixel value is 3.8+2.5j, the real part and the imaginary part of the pixel value are both greater than 0, and thus, the iris feature vector is determined to be {1, 1}. As another example, if the pixel value is −4+1.2j, the real part of the pixel value is less than 0 and the imaginary part is greater than 0, and thus, the iris feature vector is determined to be {−1, 1}. An iris code that will be described below is determined to be a set of iris feature vectors.

When the pixels of the converted iris image are expressed by the complex numbers, the inconsistent area of the converted iris image may include a first inconsistent area about the real part of the pixels and a second inconsistent area about the imaginary part of the pixels. The first inconsistent area includes the pixels, the real parts of which are close to 0 and have inconsistent binarization results. In addition, the second inconsistent area includes the pixels, the imaginary parts of which are close to 0 and have inconsistent binarization results. The first inconsistent area and the second inconsistent area are determined independently from each other. Therefore, the first inconsistent area and the second inconsistent area may be different from each other.

In order to determine the inconsistent area of the converted iris image, a range of pixel values corresponding to the inconsistent area is set. For example, when a critical value is 0.5, pixels having pixel values ranging from −0.5 to 0.5 are included in the inconsistent area. For example, when an absolute value of the pixel value is less than the critical value, the pixel is included in the inconsistent area.

When the pixel of the iris image is expressed by the real number, only one critical value is necessary. However, when the pixel of the iris image is expressed by the complex number, a first critical value regarding the real part and a second critical value regarding the imaginary part may be necessary. According to various embodiments of the present disclosure, the first critical value and the second critical value may be set to be equal to each other.

In a case where the pixel of the iris image is expressed by the complex number, the pixel may be included in the first inconsistent area when an absolute value of the real part of the pixel value is less than the first critical value. In addition, when an absolute value of the imaginary part of the pixel value is less than the second critical value, the pixel may be included in the second inconsistent area. For example, when the pixel value is 0.5-0.6j, the first critical value is 0.6, and the second critical value is 0.6, the absolute value of the real part of the pixel is 0.5 and the first critical value is 0.6, and thus, the pixel is included in the first inconsistent area. However, the absolute value of the imaginary part of the pixel value is 0.6 and the second critical value is 0.5, and thus, the pixel is not included in the second inconsistent area.

Figure 9:
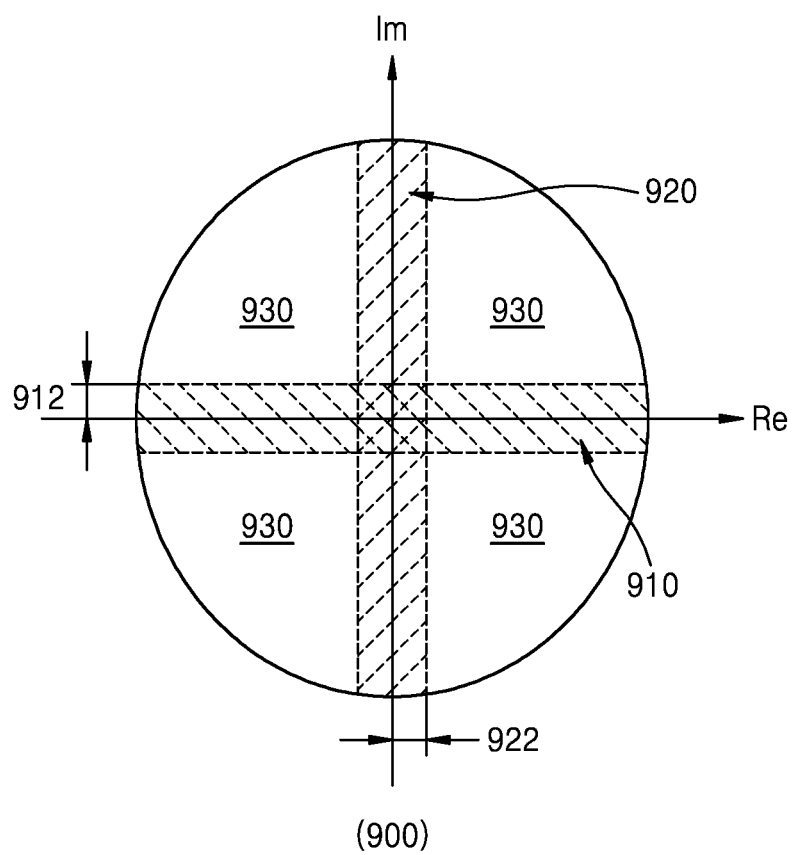
FIG. 9 is a diagram of an inconsistent area regarding an iris feature vector according to an embodiment of the present disclosure.

FIG. 9 is a diagram of an inconsistent area regarding an iris feature vector according to an embodiment of the present disclosure.

Referring to FIG. 9, as described above, it is determined that the binarization result of the pixel is not consistent when the real part or the imaginary part of the pixel expressed by the complex number is close to 0. In a graph 900, a region A 910 includes pixels having the real part, the absolute value of which is less than a first critical value 912. A region B 920 includes pixels having the imaginary part, the absolute value of which is less than a second critical value 922. The first inconsistent area is determined according to the location of the pixel corresponding to the region A 910, and the second inconsistent area is determined according to the location of the pixel corresponding to the region B 920. A pixel corresponding to a region C 930 is not blocked according to the first critical value 912 and the second critical value 922, and thus, may be used in the iris matching.

The critical value may be determined adaptively to the converted iris image. In addition, the critical value may be a fixed value regardless of the converted iris image. When the pixel of the iris image is expressed by the complex number, both the first and second critical values may be determined adaptively to the converted iris image. Likewise, both the first and second critical values may be fixed values determined in advance. According to an embodiment of the present disclosure, the first critical value is only adaptively determined to the iris image and the second critical value may be a fixed value set in advance, or vice versa.

The critical value may be determined according to a block quota that represents a ratio of pixels to be blocked. A minimum amount of the pixels to be blocked is determined according to the pixels of the converted iris image and the block quota. According to the minimum amount determined above, the pixels are included in the inconsistent area in an order in which absolute values of the pixel values increase.

For example, when the block quota is 20% and the number of pixels in the converted iris image is a hundred, at least twenty (20) pixels have to be blocked. Therefore, twenty pixels are selected in an ascending order of the absolute values of the pixel values, and the largest value among the absolute values of the twenty pixels is determined to be the critical value. In addition, it is determined that all the pixels having absolute values that are greater or less than the critical value are included in the inconsistent area. According to an embodiment of the present disclosure, one of ordinary skill in the art may change the method of setting the critical value so that only the pixels having absolute values that are less than the critical value are included in the inconsistent area.

Figure 10:
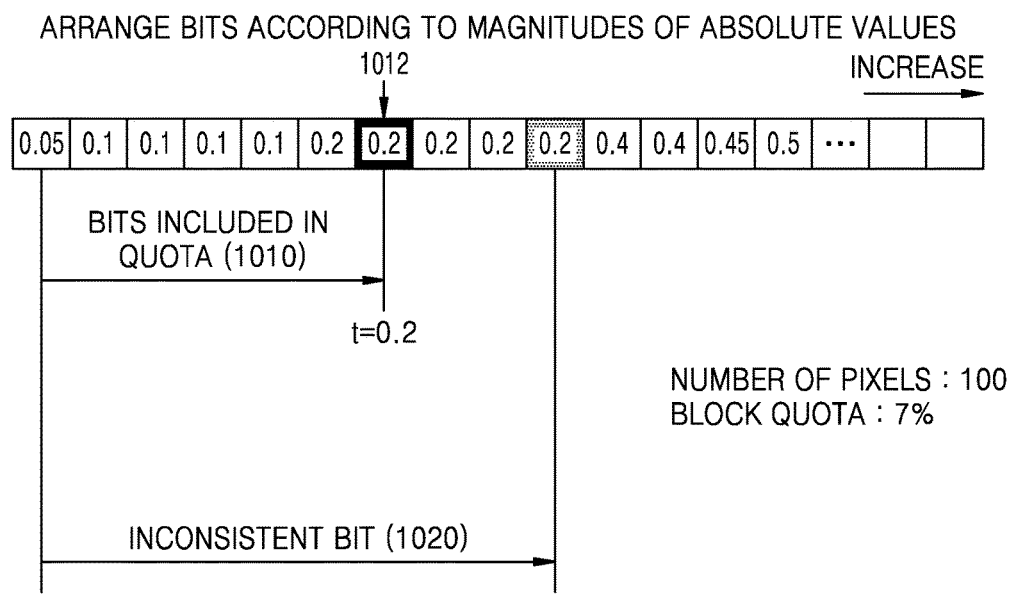
FIG. 10 illustrates determining a critical value according to a block quota according to an embodiment of the present disclosure.

FIG. 10 illustrates determining a critical value according to a block quota according to an embodiment of the present disclosure.

Referring to FIG. 10, the pixels are arranged in an ascending order of the absolute values. If the block quota is 7% and the number of pixels in the converted iris image is a hundred, it is determined that at least seven pixels (1010) are blocked. Therefore, an absolute value 0.2 of a pixel 1012 having the absolute value that is seventh smallest is determined to be the critical value. In addition, ten pixels (1020) having absolute values that are equal to or less than 0.2 are determined to be included in the inconsistent area.

The block quota may be determined in advance through statistical experiments. When the block quota is reduced, an area used in the iris matching increases and a false acceptance rate may increase, but the inconsistent area that is excluded from the iris matching is decreased and a false rejection rate may increase. On the other hand, when the block quota is increased, the inconsistent area excluded from the iris matching increases and the false rejection rate may decrease, but the area used in the iris matching decreases and the false acceptance rate may increase. Therefore, an appropriate block quota has to be used in setting the critical value.

The false rejection rate cited above denotes the number of negative verification results occurring with respect to a definitely affirmative case, for example, a case where the eyes of the same person are compared. The false acceptance rate cited above denotes the number of positive verification results occurring with respect to a definitely negative case, for example, a case where the eyes of different persons are compared. The false rejection rate and the false acceptance rate have to be maintained low in order to improve the robustness and accuracy in the iris matching.

The false rejection rate and the false acceptance rate that are allowable in the iris matching may be determined differently according to a required accuracy of the iris recognition based on the field to which the iris recognition is applied. Therefore, the block quota may be determined based on the allowable false rejection rate and the false acceptance rate.

When the pixel of the iris image is expressed by the complex number, a first block quota applied to setting of the first critical value with respect to the real part of the pixel and a second block quota applied to setting of the second critical value with respect to the imaginary part of the pixel may be separately set. The first block quota and the second block quota may be set equal to each other, or may be set differently according to experimental results.

The first mask is transformed according to the determined inconsistent area to generate the second mask. As described above, the first mask is generated to exclude the non-iris object area from the iris image in the iris matching. In addition, the second mask is generated to additionally exclude the inconsistent area including the inconsistent bit from the iris object area in the iris matching.

Figure 11:
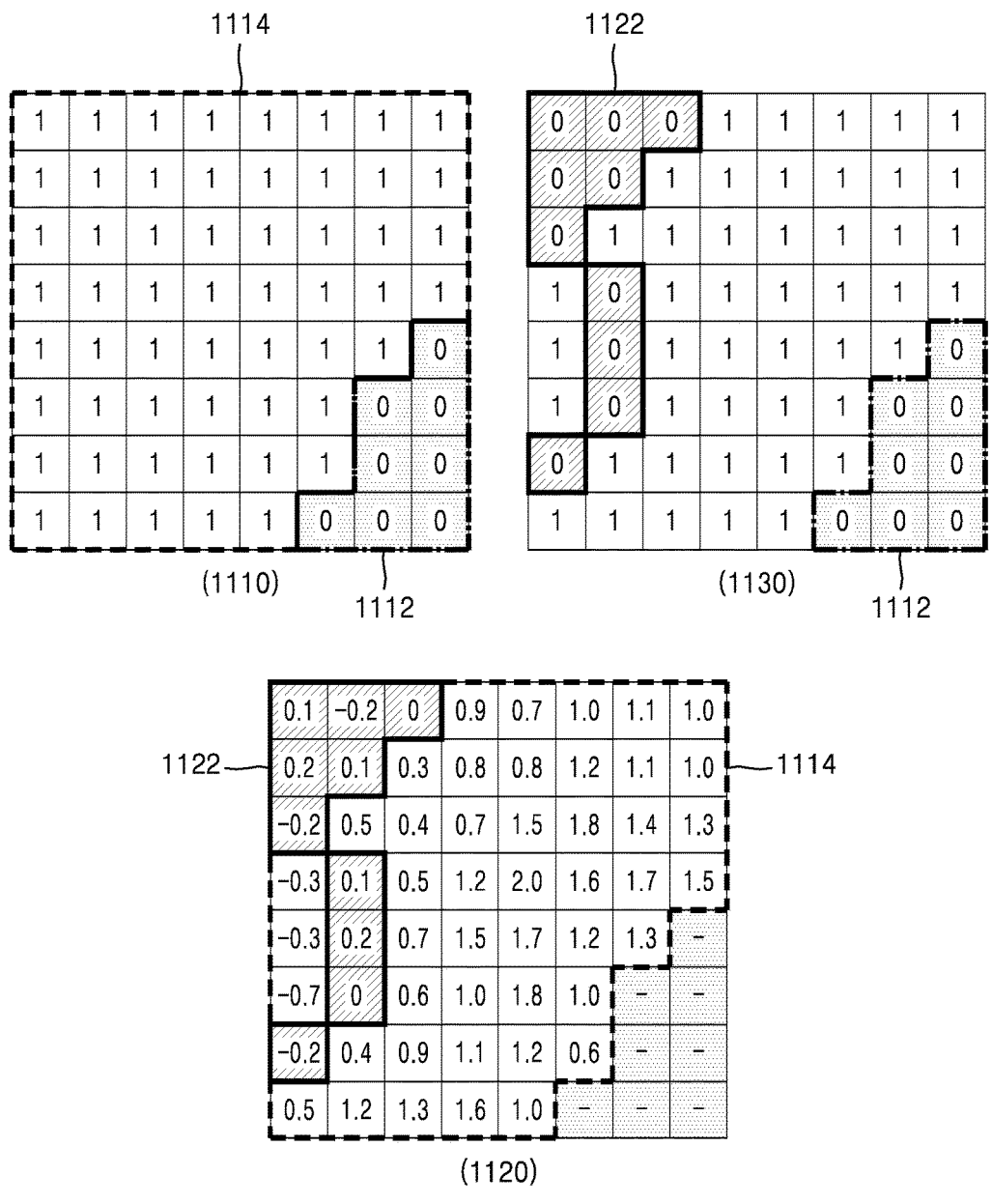
FIG. 11 illustrates generating a second mask by transforming a first mask according to features of a converted iris image according to an embodiment of the present disclosure.

FIG. 11 illustrates generating a second mask by transforming a first mask according to features of a converted iris image according to an embodiment of the present disclosure.

Referring to FIG. 11, in a first mask 1110, whether each of the pixels in the iris image is included in the non-iris object area is expressed as 0 or 1. A pixel corresponding to an element determined to be 0 is not used in the iris matching. A pixel corresponding to an element determined to be 1 is used in the iris matching.

In the first mask 1110, the elements corresponding to the pixels included in a non-iris object area 1112 are determined to be 0. In addition, the elements corresponding to the pixels included in an iris object area 1114 are determined to be 1. Therefore, when the first mask 1110 is applied to the iris image, a converted iris image in which the non-iris object area 1112 is blocked is obtained.

An image map 1120 expresses grey levels of the pixels included in the converted iris image. The pixels included in the iris object area 1114 may be expressed by the grey levels. The critical value is determined according to the grey levels of the pixels included in the iris object area 1114 and the block quota set in advance. In FIG. 11, the critical value is determined to be 0.2 as an example. Among the pixels in the image map 1120, pixels having the grey levels, absolute values of which are less than the critical value 0.2, are determined to be included in the inconsistent area 1122.

A second mask 1130 is generated by changing the elements, in the first mask 1110, corresponding to the inconsistent area 1122 from 1 to 0. Therefore, in the second mask 1130, elements corresponding to the pixels included in the non-iris object area 1112 or the inconsistent area 1122 are determined to be 0. In addition, elements corresponding to pixels that are not included in the non-iris object area 1112 or the inconsistent area 1122 are determined to be 1. Therefore, when the second mask 1130 is applied to the converted iris image, a second converted iris image, in which the inconsistent area 1122 is additionally blocked, may be obtained. In addition, when the second mask 1130 is applied to an iris code that will be described below, a converted iris code in which codes corresponding to the inconsistent area 1122 are blocked may be generated.

FIG. 11 only illustrates the process of generating the second mask 1130 in a case where the pixel values are expressed by real numbers, for convenience of description. Therefore, if the pixel value is expressed by a complex number, a second mask for the real part and a second mask for the imaginary part may be separately generated. Otherwise, one second mask may include information about the blocking of the real part and the imaginary part.

In operation S104, the elements included in the iris image are quantized to obtain an iris code.

The iris code may be obtained by quantizing pixel values expressed by the complex numbers in the iris image. As described above, binarization, that is, a kind of quantization, may be applied to the complex number value of each pixel, wherein the complex number value is generated by using a Gabor filter, and the like. As a result of binarization, the phase information of the complex numbers corresponding to the pixels may be extracted as the feature of the iris pattern. The phase information of the complex number is expressed as an iris feature vector, and an iris code is determined to be a set of iris feature vectors of the pixels.

The iris code may be obtained by binarizing pixel values expressed by the complex numbers in the iris image into two bits. In the two bits, one bit may be generated by binarizing a real part of the complex number value. In the present specification, the bit obtained by binarizing the real number value is defined as a real number binarization bit. The other bit in the above two bits may be generated by binarizing an imaginary part of the complex number value. In the present specification, the bit obtained by binarizing the imaginary number value is defined as an imaginary number binarization bit.

As another example, the iris code may be obtained by binarizing pixel values expressed by the complex numbers in the converted iris image into two bits. As another example, when the pixel values of the iris image are expressed by real numbers, the iris code may be obtained by binarizing the pixel values expressed by real numbers in the iris image or the converted iris image into two bits.

In operation S105, the second mask is applied to the iris code, and then, a converted iris code in which codes corresponding to the non-iris object area and the inconsistent area are blocked is obtained.

The real number binarization bits and the imaginary number binarization bits of the iris code are separately blocked according to the second mask, and then, a converted iris code may be obtained. For example, when the real number binarization bits are not inconsistent bits and the imaginary number binarization bits are inconsistent bits, the imaginary number binarization bits are only blocked and the real number binarization bits may be used in the iris matching.

The second mask may be expressed by bits like the first mask. If each of the pixels in the iris image is expressed by a complex number including a real part and an imaginary part, whether to block the pixel in the iris image may be expressed by two bits. Like the first mask, a bit expressed as 0 denotes that a corresponding pixel or a part of the corresponding pixel is blocked in the iris matching, and a bit expressed as 1 denotes that a corresponding pixel or a part of the corresponding pixel is not blocked in the iris matching.

Figure 12:
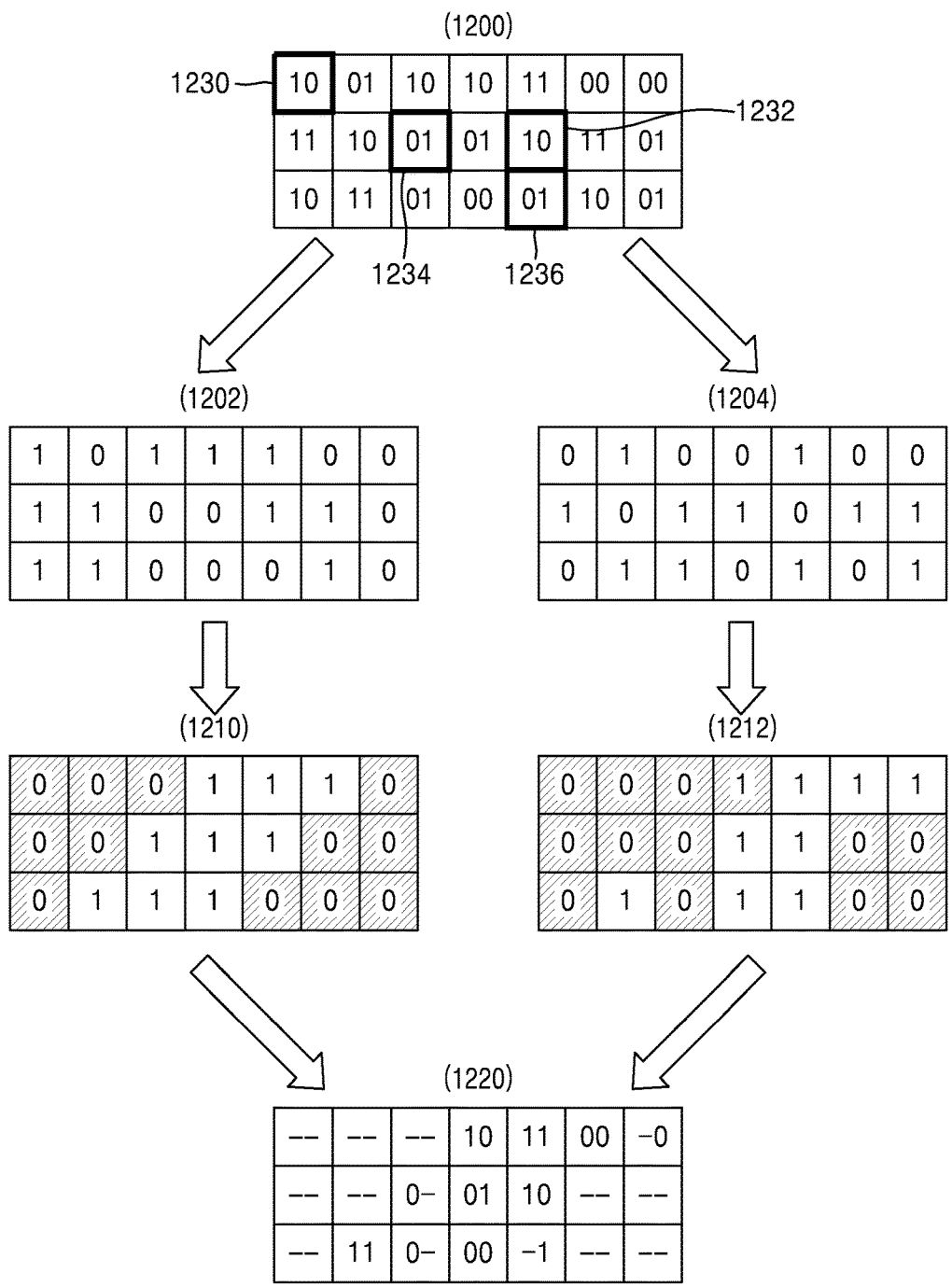
FIG. 12 illustrates obtaining a converted iris code by applying a second mask to an iris code according to an embodiment of the present disclosure.

FIG. 12 illustrates obtaining a converted iris code by applying a second mask to an iris code according to an embodiment of the present disclosure.

Referring to FIG. 12, an example of applying second masks 1210 and 1212 to an iris code 1200 is illustrated. The iris code 1200 includes codes corresponding to grey levels of the pixels included in the iris image. Each code is expressed by two bits, and the right bit in the two bits is a real number binarization bit and the left bit is an imaginary number binarization bit.

In order to apply the second mask 1210 to the iris code 1200, the iris code 1200 may be divided into a real part iris code 1202 and an imaginary part iris code 1204. The real part iris code 1202 only includes the real number binarization bit and the imaginary part iris code 1204 only includes the imaginary number binarization bit.

The second mask 1210 about the real part is applied to the real part iris code 1202. The real number binarization bit of a pixel that corresponds to an element of the second mask 1210 about the real part having a value of 0 is blocked in the iris matching.

Similarly, the second mask 1212 about the imaginary part is applied to the imaginary part iris code 1204. The imaginary number binarization bit of a pixel that corresponds to an element of the second mask 1212 about the imaginary part having a value of 0 is blocked in the iris matching.

Results of the blocking by the second mask 1210 about the real part and the second mask 1212 about the imaginary part are combined to obtain a converted iris code 1220.

Blocking according to the second mask 1210 about the real part and blocking according to the second mask 1212 about the imaginary part may be independently performed from each other. Therefore, only one bit that is not blocked in codes corresponding to the same pixels may be used in the iris matching.

A code a 1230 having a value of '10' is blocked by both the second mask 1210 about the real part and the second mask 1212 about the imaginary part. Therefore, the code a 1230 is expressed as '--' that represents that the real number binarization bit and the imaginary number binarization bit are all blocked in the converted iris code 1220.

A code b 1232 having a value of '10' is not blocked by both the second mask 1210 about the real part and the second mask 1212 about the imaginary part. Therefore, the code b 1232 is expressed as '10' in the converted iris code 1220, that is, equal to the value in the iris code 1200.

A code c 1234 having a value '01' is not blocked by the second mask 1210 about the real part, but is blocked by the second mask 1212 about the imaginary part. Therefore, the code c 1234 is expressed as '0—'representing that the imaginary number binarization bit is only blocked in the converted iris code 1220.

A code d 1236 having a value '01' is not blocked by the second mask 1212 about the imaginary part, but is blocked by the second mask 1210 about the real part. Therefore, the code d 1236 is expressed as '−1' representing that the real number binarization bit is only blocked in the converted iris code 1220.

FIG. 12 illustrates the method of blocking the code by using the second masks separately according to the real part and the imaginary part, but the second mask may be applied to the iris code without separating the real part and the imaginary part.

In operation S106, the user is recognized by matching a reference code stored in advance by the user to the converted iris code. The converted iris code that is obtained by removing the inconsistent bits of the inconsistent area from the iris code is matched to the reference iris code that is stored by the user in advance in an external or internal iris code database, in order to verify whether the iris codes match each other or whether the iris code is real. When the matching succeeds or the reality is identified, the user may execute various applications, for example, from a social network service to a mobile banking application, requiring various security levels. On the other hand, if the matching fails or the reality is not identified, the user's access to the application requiring security is denied. The storage of the reference iris code in advance may be performed by using the function of the iris recognition device that is described in the present specification.

Fields to which the suggested iris recognition method is applied may include iris-based bio verification for border control, a technique of using the iris as a bio-passport, computer log-in, a technique of using the iris as a bio password, a wireless device-based verification technique, a technique of safely accessing a bank account or a banking application via an automatic teller machine (ATM) or a mobile application, ticket-less travel, authentication of the right to a service, indoor access control (home, an office, a lab, a fridge, and the like), a driver's license, other personal verification authority, forensics, birth certificates, pursuit of car engine start and unlock by a missing person or a person as a tracking target, an anti-theft device, an anti-terrorism device (e.g., airport security inspection), financial transaction (e-commerce and e-finance) security, Internet security, confidential information access control, keys, cards, and "bio-recognition key encryption" used as a personal identification number (PIN) or a password (stabilized key of unstable template). For example, the block quota for the iris recognition in a banking application may be higher than that for the iris recognition in a social network application. The block quota may vary depending on a required accuracy in iris recognition according to the field to which the iris recognition was applied.

Figure 13:
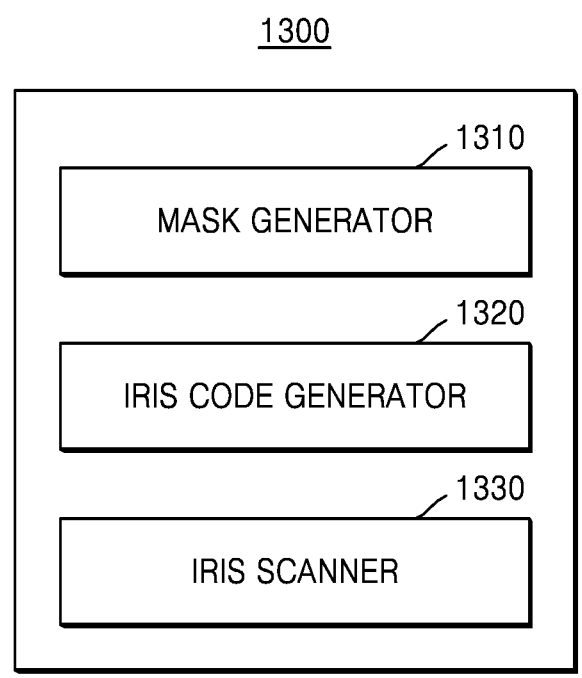
FIG. 13 is a diagram of a user recognition device by using an iris according to an embodiment of the present disclosure.

FIG. 13 is a diagram of a user recognition device by using an iris according to an embodiment of the present disclosure.

Referring to FIG. 13, a user recognition device 1300 may include a mask generator 1310, an iris code generator 1320, and an iris scanner 1330. In FIG. 13, the mask generator 1310, the iris code generator 1320, and the iris scanner 1330 are shown as separate components, but may be combined as one component in some embodiments.

Referring to FIG. 13, the mask generator 1310, the iris code generator 1320, and the iris scanner 1330 are shown as components located in one device, but devices performing the functions of the mask generator 1310, the iris code generator 1320, and the iris scanner 1330 may not be necessarily adjacent to each other physically. Therefore, the mask generator 1310, the iris code generator 1320, and the iris scanner 1330 may be dispersed in some embodiments.

According to the various embodiments of the present disclosure, the mask generator 1310, the iris code generator 1320, and the iris scanner 1330 may be implemented by one processor. Otherwise, according to the various embodiments of the present disclosure, the above components may be implemented by a plurality of processors.

The mask generator 1310 may generate the first mask for blocking the non-iris object area in the iris image. In addition, the mask generator 1310 may generate a converted iris image, in which the non-iris object area is blocked according to the first mask.

The mask generator 1310 may adaptively transform the first mask according to features of the converted iris image to generate a second mask that additionally blocks an inconsistent area, in which quantization results of the converted iris image are not consistent. The mask generator 1310 may obtain complex values representing grey levels of the pixels in the converted iris image. The mask generator 1310 may determine a critical value for determining the inconsistent bits according to the complex number value and the block quota. The critical value may be determined respectively to the real part and the imaginary part of the complex number value. Likewise, the block quota for determining the critical value may be set respectively to the real part or the imaginary part of the complex number value in advance.

The mask generator 1310 may determine whether the real part of the pixel is to be blocked in the iris matching by comparing an absolute value of the real part of the pixel expressed by the complex number with the critical value. Likewise, the mask generator 1310 may determine whether the imaginary part of the pixel is to be blocked in the iris matching by comparing an absolute value of the imaginary part of the pixel expressed by the complex number with the critical value. The mask generator 1310 may transform the second mask for blocking the inconsistent bit according to the critical value.

The mask generator 1310 may determine whether to block the pixel in the iris matching by comparing an absolute value of the pixel with the critical value, in a case where the pixel is expressed by the real number, not by the complex number. Since there is no imaginary part in the pixel, the mask generator 1310 does not generate a mask with respect to the imaginary part.

The iris code generator 1320 may obtain the iris code by quantizing the pixels included in the iris image. The iris code generator 1320 may obtain the iris code by binarizing complex number values corresponding to the pixels in the iris image.

The iris code generator 1320 may obtain a converted iris code, in which codes corresponding to the non-iris object area and the inconsistent area are blocked, by applying the second mask to the iris code. The iris code generator 1320 may obtain the converted iris code by separately performing the blocking processes of the real number binarization bits and the imaginary number binarization bits in the iris code to obtain a converted iris code.

The iris scanner 1330 may recognize the user by matching the reference iris code, stored by the user in advance, to the converted iris code.

In addition, at least one of the mask generator 1310, the iris code generator 1320, and the iris scanner 1330 may be implemented as a software module. In a case where at least one of the mask generator 1310, the iris code generator 1320, and the iris scanner 1330 is implemented as the software module (or a program module including instructions), the software module may be stored in a non-transitory computer-readable recording medium. In addition, in this case, the at least one software module may be provided by an operating system (OS), or a certain application. Otherwise, a part of the at least one software module is provided by the OS or the remaining part of the at least one software module may be provided by a certain application.

The user recognition device 1300 of FIG. 13 may perform each of the functions and processes regarding the iris recognition described with reference to FIG. 1.

Figure 14:
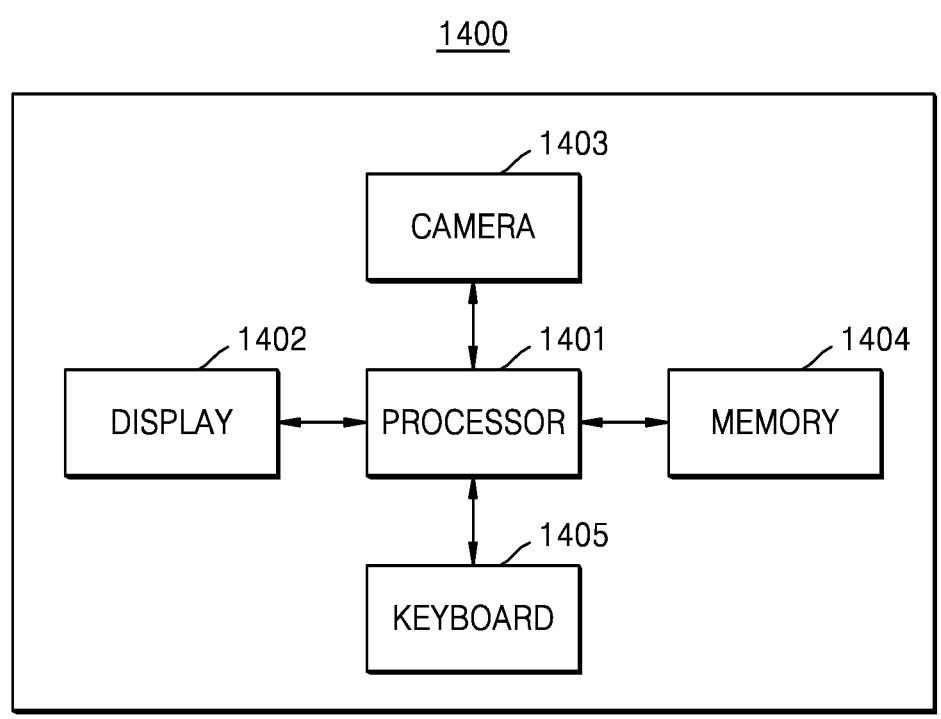
FIG. 14 is a diagram of a user device including a user recognition device according to an embodiment of the present disclosure.

FIG. 14 is a diagram of a user device including a user recognition device according to an embodiment of the present disclosure.

Referring to FIG. 14, a user device 1400 may include a processor 1401, a display 1402, an infrared ray (IR) camera 1403, a memory 1404, and a keyboard 1405.

The user device 1400 according to various embodiments of the present disclosure may include a smartphone, a tablet PC, a portable phone, a video phone, an E-book reader, a desktop PC, a laptop PC, a PDA, a PMP, an MP3 player, a mobile medical device, a camera, and a wearable device (e.g., an HMD, for example, electronic glasses, electronic clothing, an electronic bracelet, an electronic necklace, an electronic accessory, an electronic tattoo, or a smart watch).

The processor 1401 makes the camera 1403 capture an image, processes the image according to the method described in the present specification, and stores information in the memory 1404. The processor 1401 may perform functions of the components illustrated in FIG. 13. Although with reference to FIG. 14 the processor 1401 is expressed as a single processor, the processor 1401 may be provided in plural according to various embodiments.

The display 1402 displays information to the user. For example, the display 1402 may display images, a user interface for capturing images, an iris matching result, and other necessary information. In one embodiment of the present disclosure, the display 1402 may be a touch sensitive display.

The camera 1403 includes IR illumination, and is configured to perform an image capturing process as instructed by the processor 1401. The camera 1403 may include another type of light source. It should be understood that the method according to the present disclosure may be modified to use another type of light in a frame capturing process.

The memory 1404 is configured to store information. For example, the memory 1404 may store additional information about captured images, processed images, and images (e.g., iris code, mask, reference iris code, and the like).

The keyboard 1405 is used by the user to control the device. For example, the keyboard 1405 may be used to control the image capturing process. The keyboard 1405 is not limited to a physical keyboard, but may be a virtual keyboard used in a touch sensitive display.

The above-described user device is provided to perform one or more processes from among the processes included in one of the methods described in the present specification. In addition, the user may generate the reference iris code in advance by using the user device 1400. The user device 1400 may capture a face image in order to extract an eye image of the user, may process the eye image via at least some of the processes in the above-described method, and may store the processed eye image in the memory in order to use the eye image in a next iris matching process.

It should be understood that the various embodiments of the present disclosure may be implemented by using the real numbers additionally to or instead of the complex numbers. In the above embodiment of the present disclosure, one real number representing the grey level of the pixel in the iris image is binarized into one bit, not two bits applied to the complex number as described above. In addition, the iris code is a bit expression of the iris image, and the bit expression is obtained through the encoding process. A pair of bits generated from the pixel value expressed by the complex number corresponds to one point in an original image (according to binarization of the complex number). In addition, another technique of extracting features and encoding may be used. For example, a local binary pattern (LBP) transformation may be used. According to the LBP transformation, the iris image is transformed into an integer matrix (8 bits or 16 bits according to a selected type of LBP).

Regarding the present disclosure, transformation of one real number value or the complex number value into one or two discrete values (bits) may be understood under the concept of quantization. In addition, regarding the present disclosure, transformation of the numerical value of the image intensity into the bit type (iris code) may be understood under the concept of encoding. The encoding may include all the processes from the extraction of features to the process about the final formation of the code that will be stored in the memory.

The embodiments of the present disclosure are described with reference to FIGS. 1 to 14. Although the present disclosure has been described in language specific to structural features or methodological acts, it is to be understood that the subject matter defined in the appended claims is not necessarily limited to the described features or acts described above. Rather, the described features and acts are disclosed as example forms of implementing the claims. In addition, the present disclosure is not limited by the order of processes in the method, and the order may be modified by one of ordinary skill in the art without undue technical difficulty. Some or all of the processes of the method may be sequentially or simultaneously executed.

Some embodiments may be embodied in a storage medium including instruction code executable by a computer or processor, such as a program module executed by the computer. The computer-readable storage medium may be any available medium that may be accessed by a computer, and includes volatile and non-volatile media and removable and non-removable media. In addition, the computer-readable medium may include both a computer storage medium and a communication medium. The computer storage medium may include volatile and non-volatile media and removable and non-removable media that are implemented using any method or technology for storing information, such as computer-readable instructions, a data structure, a program module, or other types of data. The communication medium typically includes computer-readable instructions, a data structure, a program module, or other data of modulated data signal, such as carrier waves, or other transmission mechanisms, and includes an arbitrary information transfer medium. In addition, some embodiments may be implemented as a computer program or a computer program product including instructions executable by a computer.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user recognition method using an iris, the user recognition method comprising:
   generating a first mask for blocking a non-iris object area of an iris image;
   generating a converted iris image, in which the non-iris object area is blocked according to the first mask;
   obtaining complex number values corresponding to pixels of the converted iris image;
   generating a real number arrangement and an imaginary number arrangement by separating real number values and imaginary number values of the complex number values;
   determining a first critical value applied to the real number arrangement according to a first block quota applied to the real number arrangement;
   determining a second critical value applied to the imaginary number arrangement according to a second block quota applied to the imaginary number arrangement;
   generating a second mask, by transforming the first mask, for additionally blocking the inconsistent area that consists of inconsistent pixels, wherein sizes of pixel values of the inconsistent pixels are less than the critical value;
   obtaining an iris code by quantizing pixels included in the iris image;

obtaining a converted iris code, in which portions corresponding to the non-iris object area and the inconsistent area are blocked, by applying the second mask to the iris code; and recognizing a user by matching a reference iris code, stored by the user in advance, to the converted iris code.

2. The user recognition method of claim 1, further comprising:

obtaining an eye image from a face image;

segmenting the iris image expressed according to polar coordinates from the eye image; and normalizing the iris image to be expressed according to Cartesian coordinates.

3. The user recognition method of claim 1, wherein the obtaining of the iris code comprises obtaining the iris code by binarizing complex number values corresponding to pixels of the iris image, and wherein the complex number values are each binarized into two bits, one bit of which is a real number binarization bit obtained by binarizing a real number value in the complex number value and the other bit of which is an imaginary number binarization bit generated by binarizing an imaginary number value in the complex number value.

4. The user recognition method of claim 3, wherein the obtaining of the converted iris code comprises obtaining the converted iris code by separately blocking real number binarization bits and imaginary number binarization bits of the iris code according to the second mask.

5. The user recognition method of claim 3, wherein the obtaining of the iris code comprises binarizing the complex number values corresponding to the pixels of the iris image by applying a Gabor filter to the iris image.

6. The user recognition method of claim 5, wherein each of the complex number values corresponding to the pixels of the iris image is determined from a grey level corresponding to each pixel of the iris image.

7. The user recognition method of claim 1, wherein the first block quota denotes a certain ratio of real number values that are not used in iris matching from among real number values included in the real number arrangement, and wherein the second block quota denotes a certain ratio of imaginary number values that are not used in iris matching from among imaginary number values included in the imaginary number arrangement.

8. The user recognition method of claim 1, wherein the obtaining of the first critical value comprises obtaining the first critical value according to sizes of the real number values included in the real number arrangement and the first block quota, and wherein the transforming of the first mask comprises transforming the first mask so that a real part of a pixel corresponding to a real number value having an absolute value that is less than the first block quota is not used in the iris matching.

9. The user recognition method of claim 1, wherein the obtaining of the second critical value comprises obtaining the second critical value according to sizes of the imaginary number values included in the imaginary number arrangement and the second block quota, and wherein the transforming of the second mask comprises transforming the first mask so that an imaginary part of a pixel corresponding to an imaginary number value having an absolute value that is less than the second block quota is not used in the iris matching.

10. A user recognition device by using an iris, the user recognition device comprising:

a mask generator configured to:

generate a first mask for blocking a non-iris object area of an iris image, generate a converted iris image, in which the non-iris object area is blocked according to the first mask, obtain complex number values corresponding to pixels of the converted iris image, generate a real number arrangement and an imaginary number arrangement by separating real number values and imaginary number values of the complex number values, determine a first critical value applied to the real number arrangement according to a first block quota applied to the real number arrangement, determine a second critical value applied to the imaginary number arrangement according to a second block quota applied to the imaginary number arrangement, generate a second mask, by transforming the first mask, for additionally blocking the inconsistent area that consists of inconsistent pixels, wherein sizes of pixel values of the inconsistent pixels are less than the critical value;

an iris code generator configured to:

obtain an iris code by quantizing pixels included in the iris image, and obtain a converted iris code, in which portions corresponding to the non-iris object area and the inconsistent area are blocked, by applying the second mask to the iris code; and an iris scanner configured to recognize a user by matching a reference iris code, stored by the user in advance, to the converted iris code.

11. A computer program product comprising at least one non-transitory computer-readable storage medium, wherein the computer-readable storage medium comprises instructions to:

generate a first mask for blocking a non-iris object area of an iris image;

generate a converted iris image, in which the non-iris object area is blocked according to the first mask;

obtain complex number values corresponding to pixels of the converted iris image, generate a real number arrangement and an imaginary number arrangement by separating real number values and imaginary number values of the complex number values, determine a first critical value applied to the real number arrangement according to a first block quota applied to the real number arrangement, determine a second critical value applied to the imaginary number arrangement according to a second block quota applied to the imaginary number arrangement, and generate a second mask, by transforming the first mask, for additionally blocking the inconsistent area that consists of inconsistent pixels, wherein sizes of pixel values of the inconsistent pixels are less than the critical value;

obtain an iris code by quantizing pixels included in the iris image;

obtain a converted iris code, in which portions corresponding to the non-iris object area and the inconsistent area are blocked, by applying the second mask to the iris code; and recognize a user by matching a reference iris code, stored by the user in advance, to the converted iris code.

12. The user recognition device of claim 10, wherein the iris code generator is further configured to:
obtain an eye image from a face image,
segment the iris image expressed according to polar coordinates from the eye image, and
normalize the iris image to be expressed according to Cartesian coordinates.

13. The user recognition device of claim 10,
wherein the iris code generator is further configured to obtain the iris code by binarizing complex number values corresponding to pixels of the iris image, and
wherein the complex number values are each binarized into two bits, one bit of which is a real number binarization bit obtained by binarizing a real number value in the complex number value and the other bit of which is an imaginary number binarization bit generated by binarizing an imaginary number value in the complex number value.

14. The user recognition device of claim 13, wherein the iris code generator is further configured to obtain the converted iris code by separately blocking real number binarization bits and imaginary number binarization bits of the iris code according to the second mask.

15. The user recognition device of claim 13, wherein the iris code generator is further configured to binarize complex number values corresponding to the pixels of the iris image by applying a Gabor filter to the iris image.

16. The user recognition device of claim 15, wherein each of the complex number values corresponding to the pixels of the iris image is determined from a grey level corresponding to each pixel of the iris image.

* * * * *